(12) United States Patent
Ballew (10) Patent No.: US 11,448,953 B2
(45) Date of Patent: *Sep. 20, 2022

(54) OVERHEAD FRAME CORNERS

(71) Applicant: Tony J. Ballew, Livingston, MT (US)

(72) Inventor: Tony J. Ballew, Livingston, MT (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/902,171

(22) Filed: Jun. 15, 2020

(65) Prior Publication Data

US 2020/0310238 A1   Oct. 1, 2020

Related U.S. Application Data (62) Division of application No. 16/035,352, filed on Jul. 13, 2018, now Pat. No. 10,768,519.

(51) Int. Cl.
*G03B 21/64* (2006.01)
*G03B 21/30* (2006.01)
*G03B 21/32* (2006.01)
*A47G 1/10* (2006.01)

(52) U.S. Cl.
CPC ............... *G03B 21/64* (2013.01); *A47G 1/10* (2013.01); *G03B 21/30* (2013.01); *G03B 21/32* (2013.01)

(58) Field of Classification Search
CPC ........ G03B 21/30; G03B 21/32; G03B 21/64; G03B 21/145; G03B 15/0436; G03B 15/0442; G03B 15/15; A47G 1/10; A47G 1/12; A47G 1/102; A47G 1/105; A47G 1/142; A47G 1/146; A47G 1/1613
See application file for complete search history.

(56) References Cited

U.S. PATENT DOCUMENTS

| | | | |
|---|---|---|---|
| 2003/0183348 A1* | 10/2003 | Carter | A45C 9/00 160/135 |
| 2003/0192271 A1* | 10/2003 | Koutras | G09F 15/0068 52/285.1 |
| 2013/0194662 A1* | 8/2013 | Kepley, Jr. | G03B 21/58 211/13.1 |
| 2017/0255291 A1* | 9/2017 | Hinson | G03B 21/145 |
| 2018/0282963 A1* | 10/2018 | Biebel | E02B 7/26 |

* cited by examiner

*Primary Examiner* — Sultan Chowdhury (57) ABSTRACT

Improved corners for overhead frames having primary and secondary fasteners that are located within the distal rectangular periphery of alpha oriented overhead frame components so that the width of bundled overhead frames is reduced; protrusions leading to snagging are eliminated; obstructions to the preferred, industry-wide, disassembled frame orientation are precluded; and frame components may be rigidly bundled into the alpha orientation without the wasteful and time-consuming use of temporary materials.

9 Claims, 9 Drawing Sheets

OVERHEAD FRAME CORNERS

CROSS-REFERENCE TO RELATED APPLICATIONS

This is a division of application Ser. No. 16/035,352 filed Jul. 13, 2018.

FEDERALLY SPONSORED RESEARCH

Not Applicable

SEQUENCE LISTING OR PROGRAM

Not Applicable

BACKGROUND OF THE INVENTION

Field of Invention

This invention relates to motion picture and still photography equipment, specifically to corners for overhead frames.

Prior Art

FIGS. 3-6, 7A, 8A

This overview of the prior art will reference the drawing figures of the present invention. Please note that retainers 36 and 46 in referenced FIG. 2 and FIG. 5 do not exist in the prior art.

Figure 3:
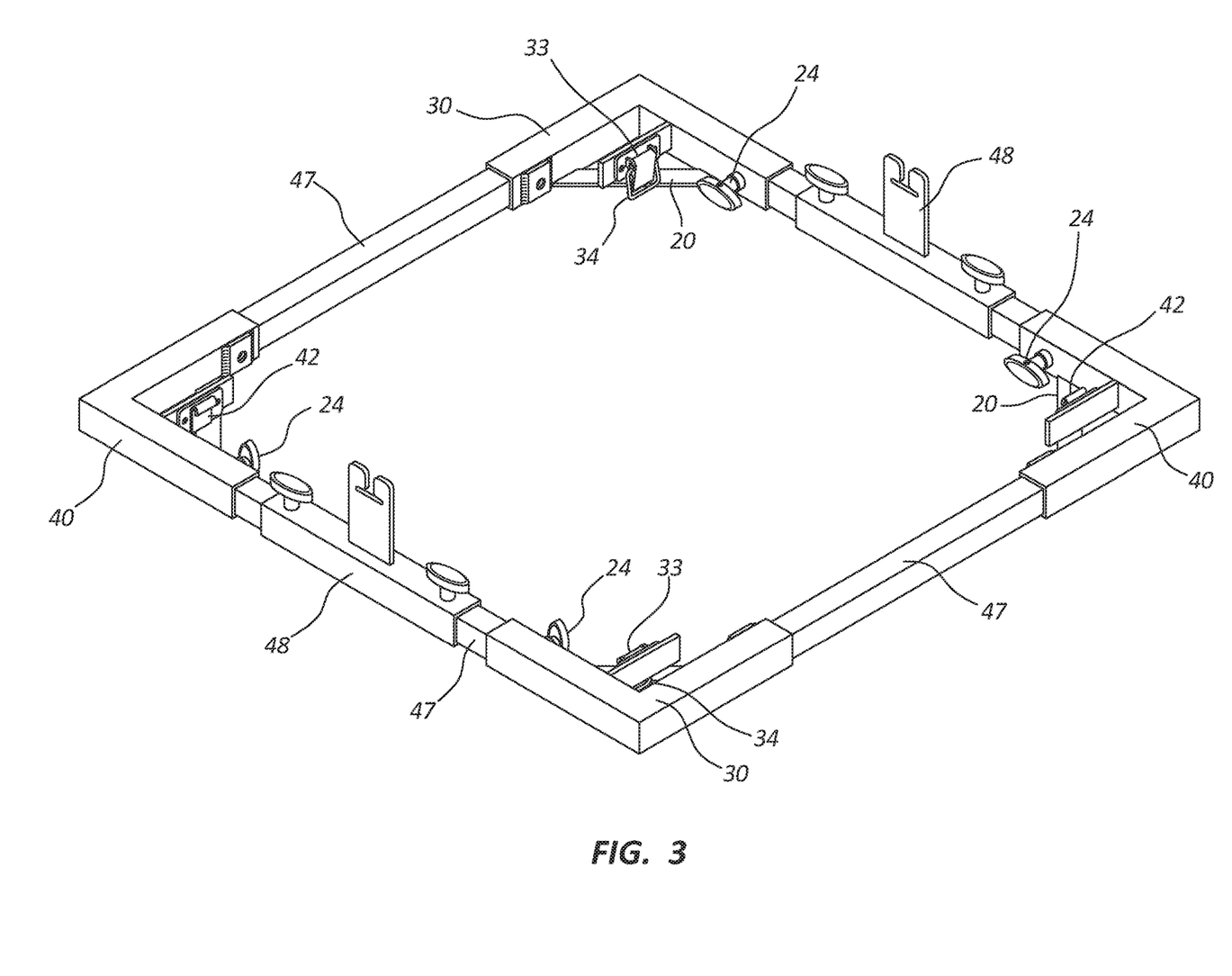

Overhead frames have been used in the motion picture industry for decades. Various materials are tied into the frame to diffuse, reduce, cut, or bounce light. FIG. 3 shows typical components of overhead frames comprising four sides of alloy or aluminum square tubing; four corner structures, or corners, to hold the sides in a square or rectangular shape on a single plane; two movable ears with which to suspend the frame; and one or more types of component fasteners mounted to the ears and corners with which to removably connect the components.

Figures 7A, 8A:
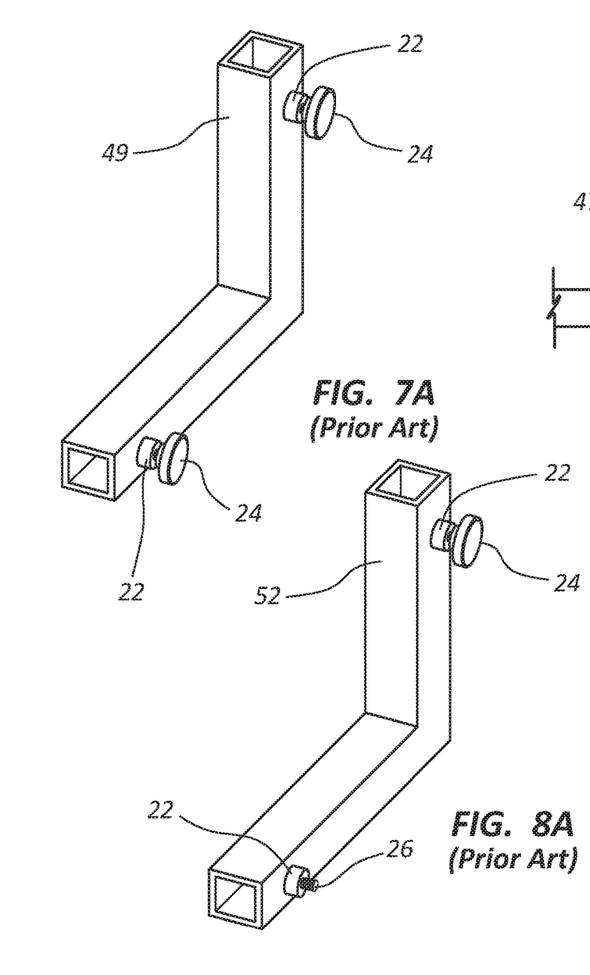

One type of component fastener, the primary fastener, is seen in FIGS. 7A and 8A and comprises set screws and T-handle bolts that are threaded into nuts affixed to the ears and corners. The primary fasteners secure the corners and ears to the sides of the frame when assembled, as in FIG. 3 of the present invention. Another type of component fastener, the secondary fastener, is a recent development that rigidly secures frame components in a specific orientation when disassembled. Currently, this secondary fastener type is known to be used on only one manufacturer's prior art overhead frame, FIG. 9, and is discussed below.

Overhead frames are usually disassembled for ease of storage and reassembled for use. Two prevalent degrees of disassembly, noted here as full disassembly and minimal disassembly, are uniformly employed throughout the industry. In both disassembly configurations, the primary fastener set screws and T-handle bolts remain at least partially threaded into the ears and corners to expedite reassembly.

With full disassembly, the four corners and two ears are completely removed from the sides and stored separately. The four sides are usually bundled together with materials such as tape, strings, or hook and loop straps. Full disassembly results in ten component pieces.

Figure 4:
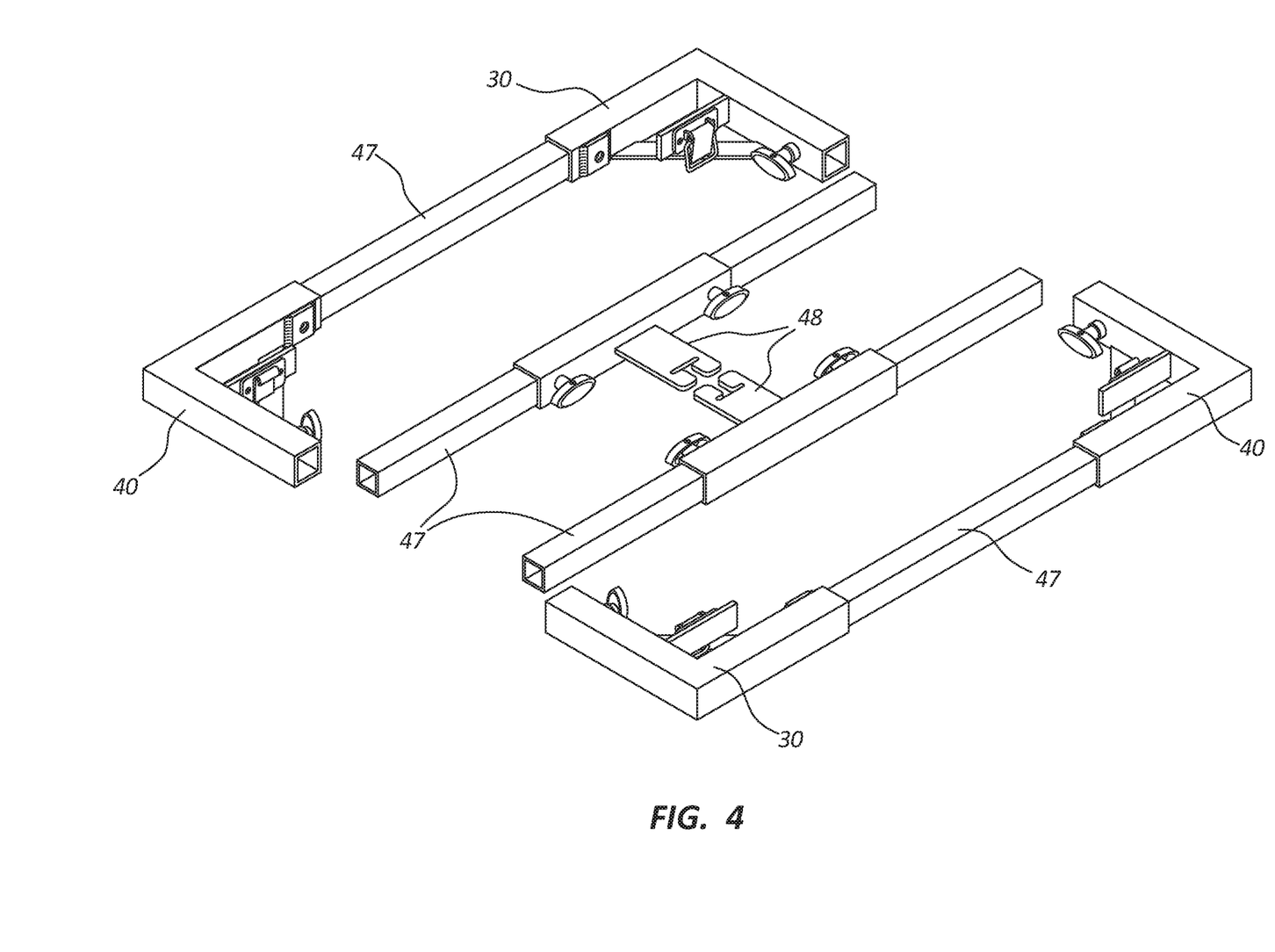

With minimal disassembly, the corners and ears remain attached to the sides in a specific fashion, as shown in FIG. 4 of the present invention. The corners are left attached at each end of two sides. Ears are left attached to the remaining two sides. This minimal disassembly, herein referred to as the "prime configuration," results in four component pieces. The benefits of minimal disassembly, or prime configuration, over full disassembly are realized by reduction in assembly and disassembly times. In addition, the various components are stored together, thus eliminating multiple component locations and possible misplacement.

Figure 2:
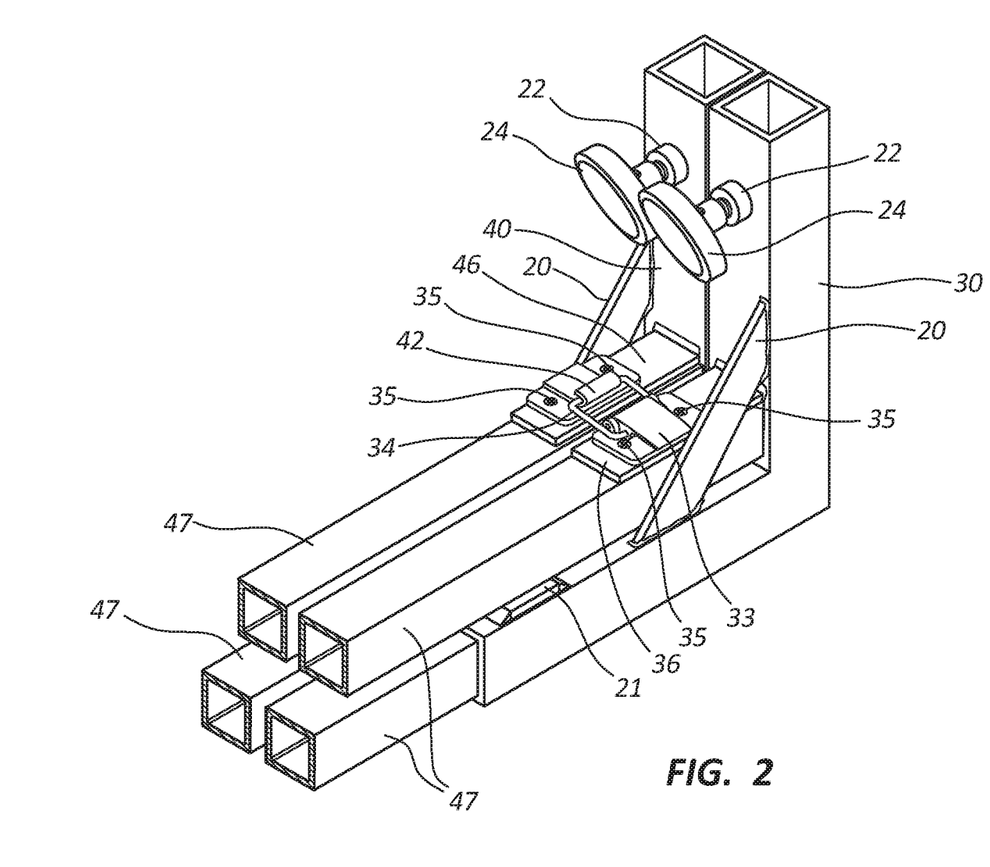

To further prepare prime-configured components for storage, a specific orientation is used. To achieve a compact bundle with minimal space between components, the sides with ears, or the "swing sides," are placed between the corners, as in FIG. 5. (As noted, retainers 36 and 46 are absent in the prior art.) Placement of each swing side between the corners results in two complete half-frames. The two half-frames are then positioned in a side by side orientation, as in FIG. 6. When the two frame halves are moved into closest adjacent proximity, the four sides are found in a relative position to one another that is substantially square in cross-sectional profile (as seen in FIG. 2). In addition, a bundle is created whose outer or distal peripheries form a three-dimensional rectangular shape, as indicated by the broken lines of FIG. 6 of the present invention. This specific orientation places frame components into the most compact and positionally stable arrangement possible. It is herein referred to as the "alpha orientation." The prior art alpha-oriented bundle, absent retainers 36 and 46, is then secured with materials such as string, tape, or hook and loop straps. Despite the cumulative advantages of prime-configured components further positioned into the efficient alpha orientation, until now, substantial disadvantages have persisted.

Figure 9:
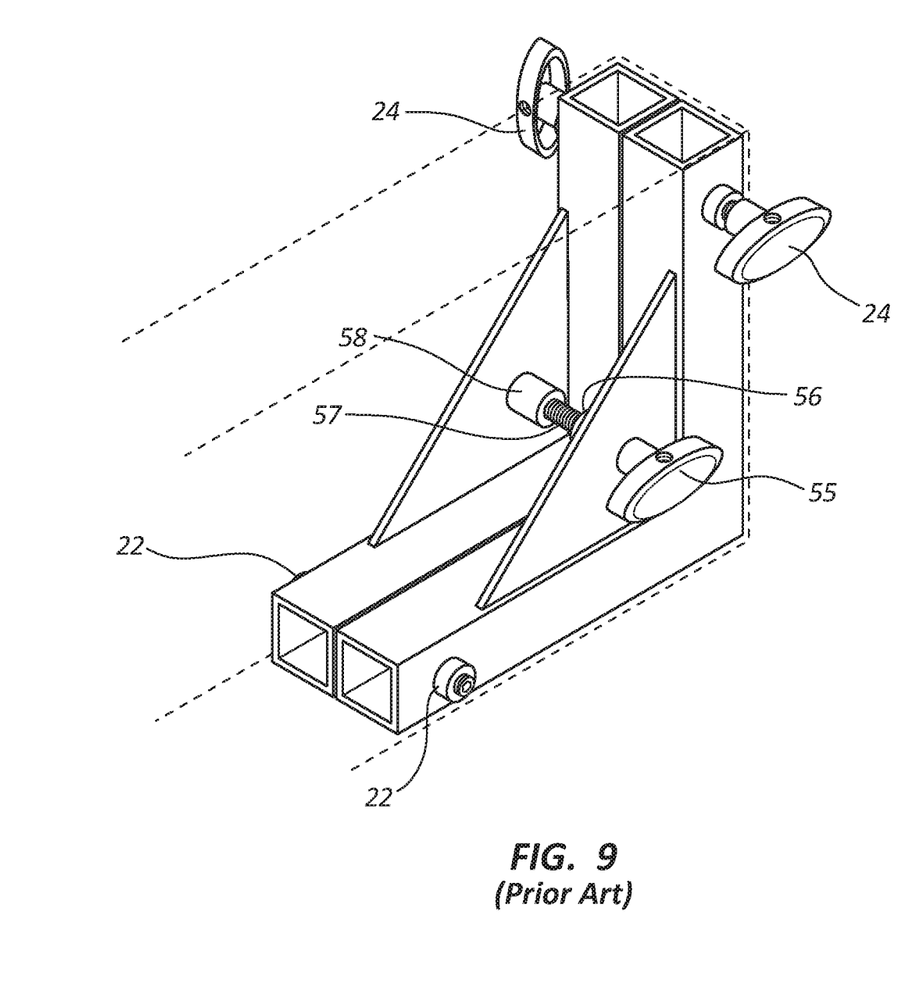

The main disadvantages of the alpha orientation in regard to the prior art corners are found in various aspects of their primary and secondary fasteners. The typical, prior art centerline orientation of the corner's primary set screws and T-handle bolts is seen in FIGS. 7A, 8A, and 9, and is perpendicular to the plane of an assembled frame. For components in the alpha orientation, this centerline orientation places the T-handles and set screws outside of the distal rectangular peripheries of the bundled frame, as shown by the broken lines in FIG. 9, thus substantially increasing the frame's effective bundled width. This increased width often more than doubles the space needed for storage. These perpendicular T-handle and set screw orientations also create unwanted protrusions that snag on other frames when removing only one frame from among many in close proximity. The issue of snagging is especially pronounced when sliding bundled frames onto a shelf from the shelf's end, as is regularly encountered in equipment rental facilities or on motion picture equipment trucks. Attempts at simply repositioning T-handle bolt or set screw orientations in order to overcome these disadvantages have only complicated component bundling into the alpha orientation, and have thus created a different set of disadvantages, as discussed next.

Figures 7B, 8B:
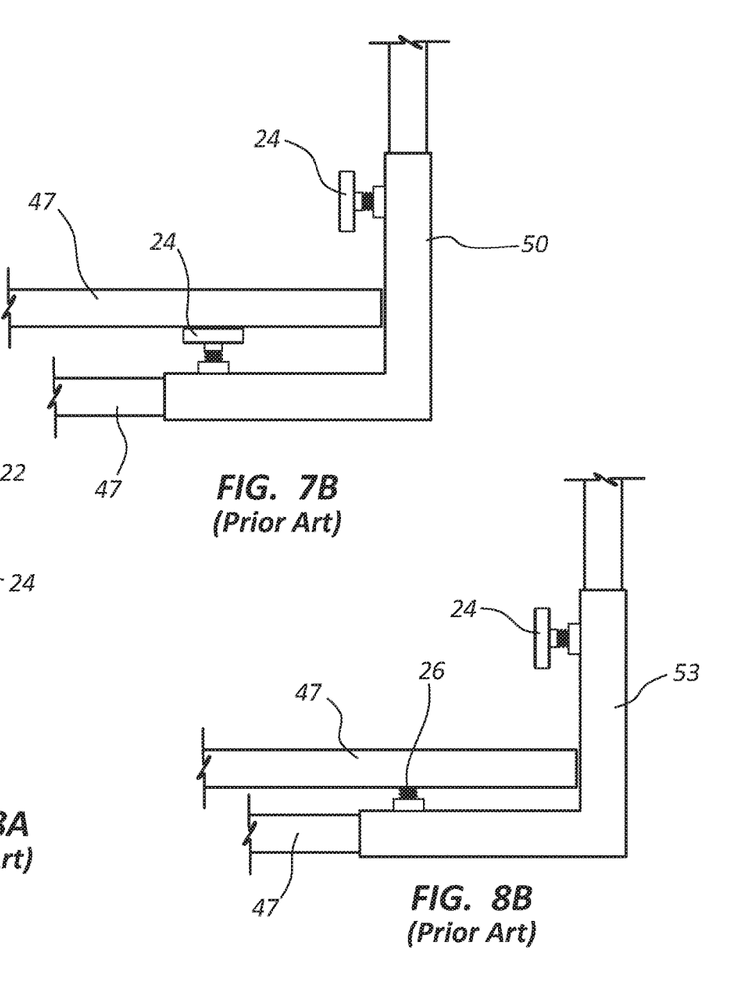

Due to the simplicity of overhead frames, there have been few improvements. American® is one of many manufacturers who offer corners with perpendicularly oriented T-handle centerlines, seen in FIG. 7A. American® also offers optional corners with repositioned T-handle centerlines, FIG. 7B. This optional T-handle repositioning does reduce the overall width of corners. However, simply repositioning T-handles in this manner creates an obstruction which disallows alpha orientation by requiring that the swing sides be positioned on top of the lower T-handles, as seen in FIG. 7B. Such repositioning creates an awkward situation and difficulty while attempting to tie or tape the bundle. In addition, the increased height of the bundle is positionally unstable and easily compromised when tied in usual fashion.

Along with other manufacturers, American® now also offers corners with set screws at locations not requiring disassembly in a prime configuration. The set screws and T-handles are pictured in their literature as employing only centerline orientations perpendicular to the assembled frame's plane, as seen in FIG. 8A. Currently, there are no known corners whose set screw orientations deviate from this perpendicular orientation. In the event that set screws and T-handles were repositioned as in FIG. 8B, an obstruction would again be created, thus complicating alpha orientation. Balancing sides on top of such repositioned lower set screws or set screw nuts while attempting to tie or secure the bundle promises to be an awkward ordeal, leading to an insecure, positionally unstable bundle arrangement even when tied.

One substantial frame improvement is the Hollywood™ overhead frame, FIG. 9, manufactured by Matthews Studio Equipment®. For its primary fasteners, the Hollywood™ corners use typical T-handle bolt and socket head set screw centerlines oriented perpendicularly to the plane of the assembled frame. These corners therefore do not restrict alpha component orientation. The improvement of this frame is found in its secondary fasteners. These secondary fasteners comprise a latch apparatus (55, 56, 57, and 58) of specifically placed T-handle bolts and nuts which retains and secures alpha-oriented frame components (sides not shown) in rigid fashion, thereby eliminating cumbersome, wasteful, and time-consuming use of materials such as tape, strings, or hook and loop straps. Even with its advantages, however, this frame not only retains the noted disadvantages regarding the perpendicular centerline orientation of its primary set screws and T-handle bolts, but also relies upon that orientation for its secondary fastener apparatus. The broken lines of FIG. 9 illustrate the primary and secondary fasteners protruding beyond the distal rectangular frame peripheries of its alpha-oriented frame.

BACKGROUND OF THE INVENTION—OBJECTS AND ADVANTAGES

Accordingly, several objects and advantages of the present invention are
(a) to provide secondary fasteners that eliminate the use of temporary, cumbersome, or inefficient materials such as tape, strings, or hook and loop straps;
(b) to provide secondary fasteners and other component improvements that allow rigid, positionally stable bundling of frame components into the alpha orientation;
(c) to provide secondary fasteners and other component improvements that eliminate protrusions which complicate stowage and retrieval of a frame bundled into the alpha orientation; and
(d) to provide secondary fasteners and other component improvements that reduce the space required for storage of a frame bundled into the alpha orientation.

SUMMARY

In accordance with the present invention, overhead frame corners with improvements comprising secondary fasteners that are positioned within the distal rectangular periphery of prime-configured overhead frame components in the alpha orientation, whereby alpha-oriented frames may be bundled in rigid fashion, protrusions from alpha-oriented frames are eliminated, and width of alpha-oriented frames is reduced.

DRAWINGS—FIGURES

FIG. 1 Preferred embodiment—on corners with gussets
FIG. 2 Preferred embodiment—on corners without gussets
FIG. 3 Overhead frame—fully assembled configuration
FIG. 4 Frame—minimally disassembled into prime configuration
FIG. 5 Swing sides positioned between corners
FIG. 6 Prime configured components in alpha orientation
FIG. 7A Prior art corner with perpendicularly oriented T-handles
FIG. 7B Prior art corner, side view, repositioned T-handles
FIG. 8A Prior art corner with perpendicularly oriented set screw and T-handle
FIG. 8B Prior art corner with repositioned set screw and T-handle
FIG. 9 Prior art Matthew's® Hollywood™ Corners
FIG. 10 Latch assembly in alternate location

DRAWINGS—REFERENCE NUMERALS

20 Gussets
21 Bridge Component
22 Primary Nut
24 T-handle Tension Bolt
26 Socket Head Set Screw
30 Latch Corner Assembly
31 Latch Retainer
32 Draw Latch—Latch Body Half
33 Latch Actuator Lever
34 Latch Member
35 Draw Latch Fastener Means
36 Alternative Latch Retainer
40 Strike Corner Assembly
41 Strike Retainer
42 Draw Latch—Strike Member Half
46 Alternative Strike Retainer
47 Side (Reduced Length—Not to Scale)
48 Ear
49 Prior Art Corner Assembly, Perpendicular T-handles
50 Prior Art Corner Assembly, Reoriented T-handles
52 Prior Art Corner Assembly; Perpendicular Set Screw, T-handle
53 Prior Art Corner-Assembly; Reoriented Set Screw, T-handle
55 Matthews® Latch Screw Handle
56 Matthews® Latch Screw Retainer
57 Matthews® Latch Screw
58 Matthews® Latch Screw Nut

Figure 1:
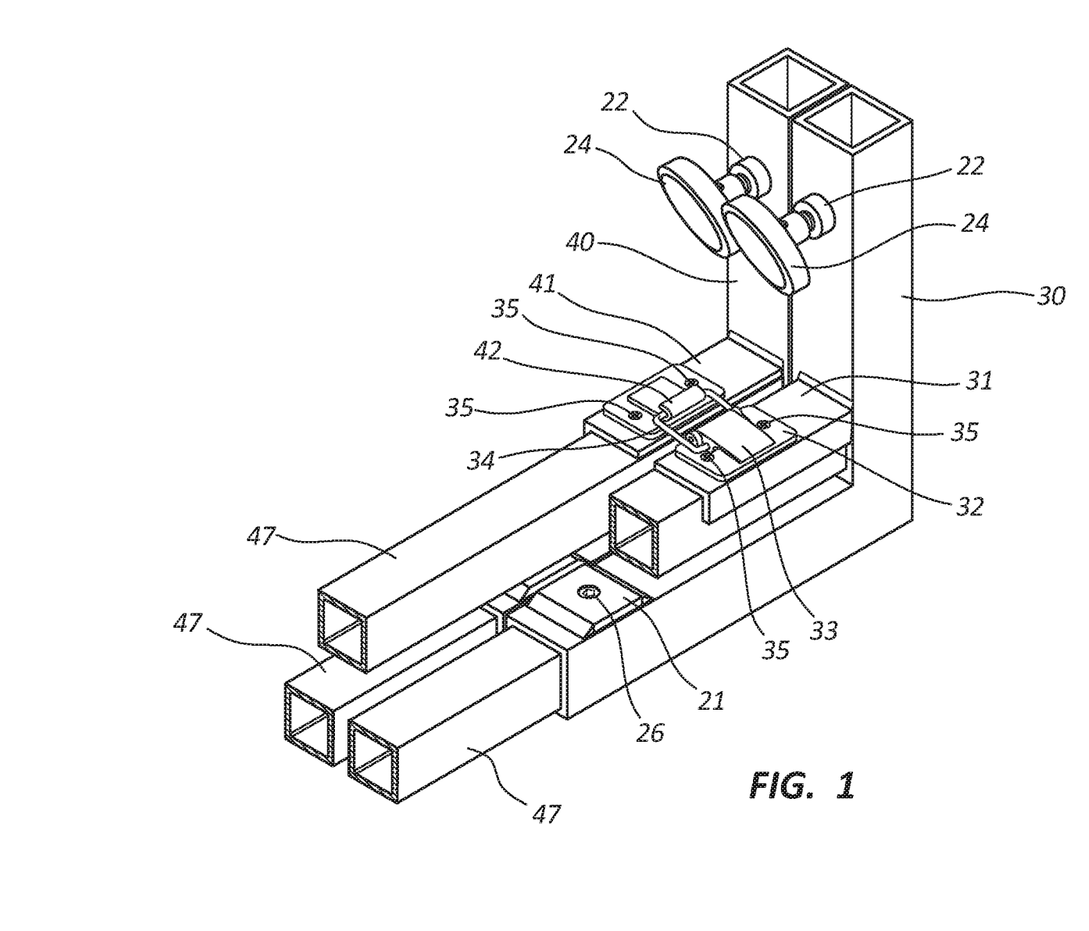

DETAILED DECRIPTION—PREFERRED EMBODIMENT, FIGS. 1, 2, 8

In FIG. 1, a latch corner 30 forms a pair with an adjacent strike corner 40. The pair, excluding a latch assembly, is fabricated as a mirror image of one another. Corners 30 and 40 are each constructed of two sections of square tubing welded at 90° to one another, thus comprising a vertical leg and a horizontal leg. Depending upon various manufacturers' preferences, gussets 20 may be welded diagonally between the two 90° legs in relative orientations as shown in FIG. 2, or may be eliminated as in FIG. 1.

The corners are fitted with primary fasteners comprising primary nuts 22, T-handle tension bolts 24, bridge components 21, and set screws 26. Primary nuts 22 are welded to both corner assemblies near the socket end of the vertical legs' inner surfaces to accommodate T-handle tension bolts 24. Nuts 22 are positioned over bores, not shown, passing through the square tubing of both corner assemblies which allow bolts 24 to pass through the square tube. The primary set screws 26 are mated into bridge components 21, which are welded to both corner assemblies near the socket end of the horizontal legs' upper surfaces. Each bridge 21 comprises a planar surface of such minimum predetermined size to provide adequate lateral stabilization of alpha-oriented sides placed against it. Bridges 21 are bored, with the bore passing through both the bridge and the square tubing. Each bore is tapped to receive screw 26.

Corners 30 and 40 are also fitted with secondary fasteners comprising a latch retainer; a strike retainer; and a latch assembly that comprises a latch body half and a strike member half. For corners on which a manufacturer prefers gussets 39, as in FIG. 2, retainers 36 and 46 are constructed of a flat, rigid material having upper and lower horizontal faces, as shown. For corners on which a manufacturer prefers no gussets, as in FIG. 1, retainers 31 and 41 further include a vertical appendage having inner and outer vertical surfaces. The vertical appendage of retainers 31 and 41 is of predetermined size to provide adequate lateral restraint of alpha-oriented swing sides 47 that are otherwise restrained by gussets.

Latch retainers 31 or 36, or 31/36 as applicable, are positioned above and parallel to the horizontal leg of corner 30 and is welded to the vertical leg's inner surface of corner 30 as in FIG. 1 or FIG. 2. The distance between the lower face, or "underside" of latch retainer 31/36 and the upper surface of the horizontal leg directly beneath the retainer is equal to or greater than the sum of the inside diameter of corner 30 plus the thickness of bridge 21.

Strike corner 40 is fitted with a strike retainer 41 or 46, or 41/46 as applicable. Retainer 41/46 is positioned above and parallel to the horizontal leg of corner 40 and is welded to the vertical leg's inner surface of corner 40 as in FIG. 1 or FIG. 2. The distance between the lower face or "underside" of strike retainer 41/46 and the upper surface of the horizontal leg directly beneath the retainer is equal to that of latch retainer above.

For the preferred embodiment latch assembly, a well-known article of trade "over-center" style draw latch is used. The latch body half 32 comprises a latch actuator lever 33 attached to a latch body 32, and a latch member 34. The attachment point between lever 33 and body 32 is effectively identified as a fulcrum point. Latch body half 32 is fastened to the latch retainer 31/36 by fastener means 35 of predetermined style from a group including rivets, machine screws, and tack welds. The strike member half 42 is of such a design to receive and engage latch member 34 and is fastened to strike retainer 41/46 by fastener means 35 at such a location that allows latch member 34 to engage the strike member.

Operation—FIGS. 3, 4, 5, 6

Figure 5:
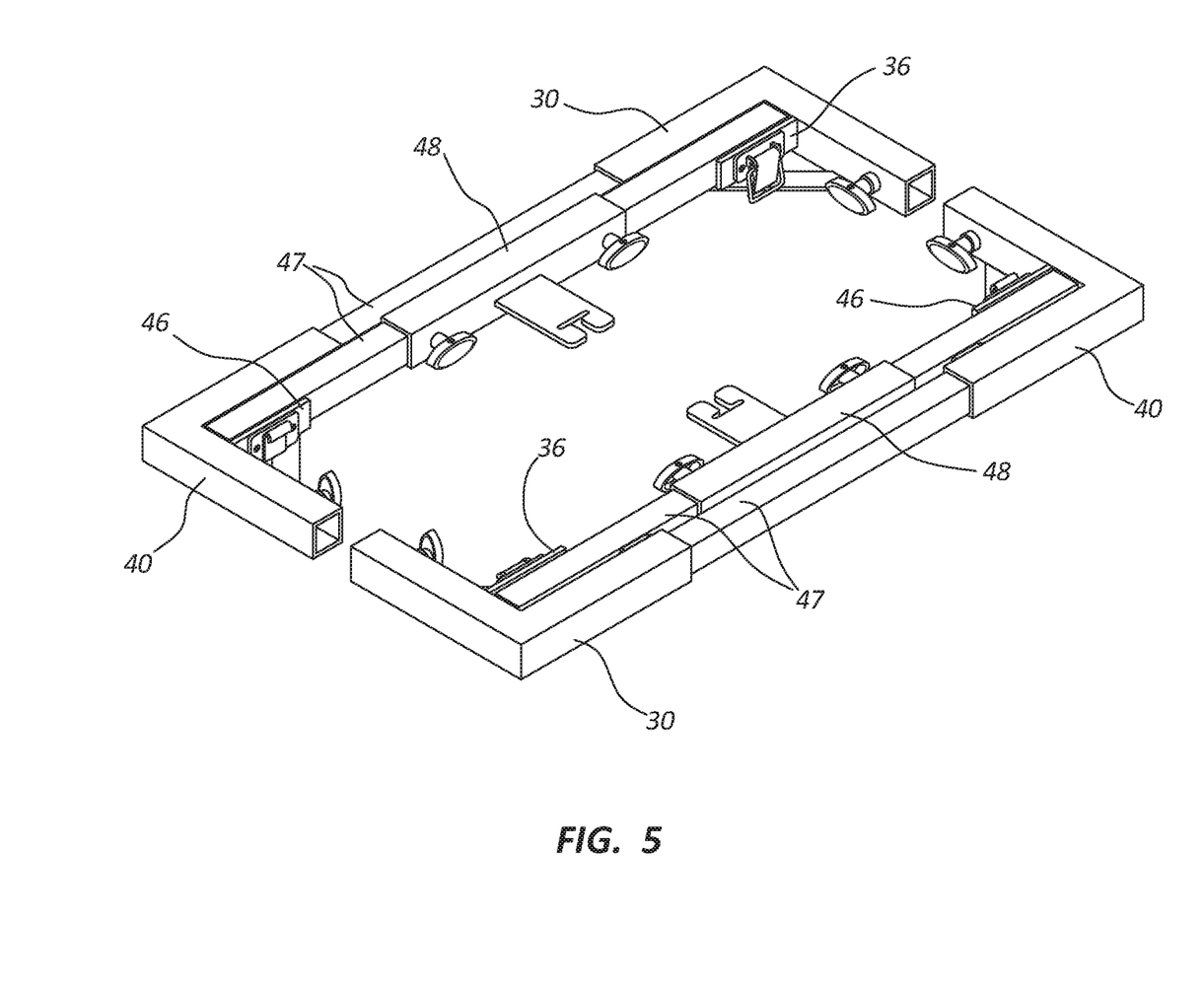

FIG. 3 shows a fully assembled overhead frame. To disassemble and bundle the frame, the four T-handle bolts 24, one per corner, are loosened. In FIG. 4, with each corner's bolts 24 sufficiently loosened, the swing sides (the two sides 47 with ears 48 still attached) are separated from the frame. In FIG. 5, the swing sides are placed between the corners and into the voids beneath retainers 31/36 and 41/46.

Figure 6:
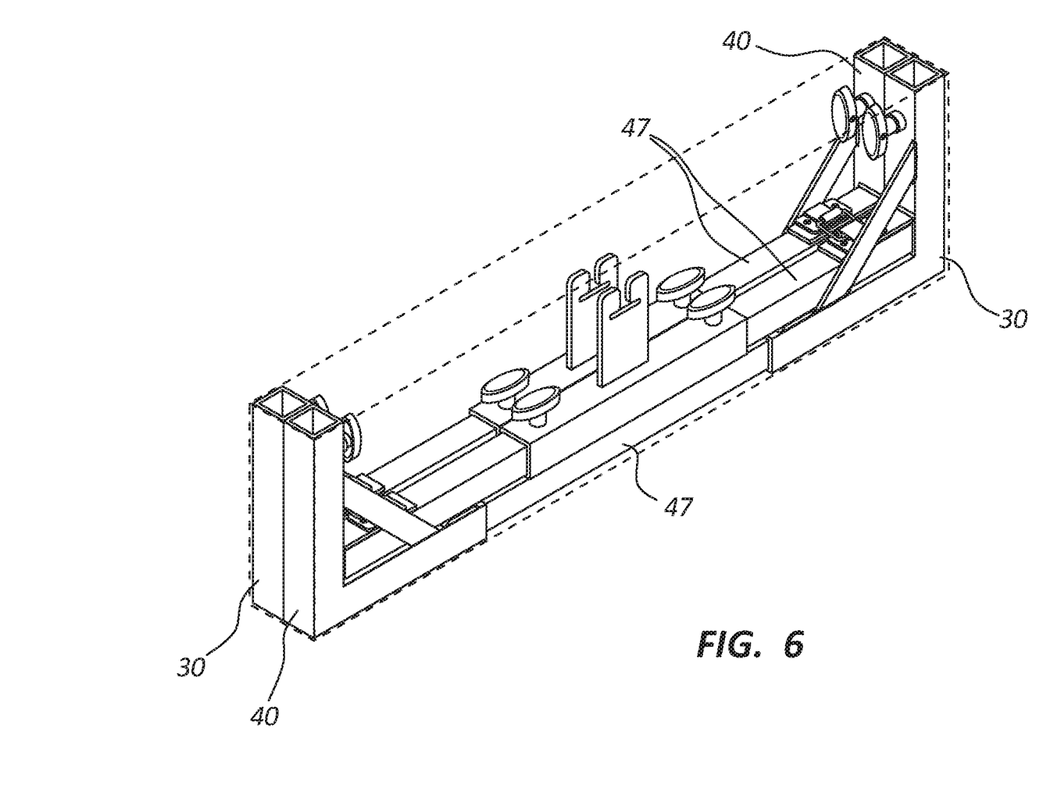

The resultant two frame halves are placed into alpha orientation, as shown in FIG. 6. Latch actuator lever 33 is then lifted and latch member 34 is placed into engagement with the strike member 42. Actuator lever 33 is depressed, thereby tensioning latch member 34 to strike 42. The latching process is duplicated on the remaining pair of corners. Overhead frame assembly is the reverse of disassembly.

Preferred Embodiment Ramifications

An over-center, lever-actuated style draw latch is described for the preferred embodiment. Other well-known styles of latches also meet the objects and advantages criteria and may be used. These include rotary and cam style latches, as defined below.

For the over-center latch of the present invention, the latch member is first manually positioned into engagement with the strike member. A single-action, straight-line force along the latch member's longitudinal axis is actuated by way of leverage against a fulcrum, thereby supplying sufficient fastening tension of the latch member against the strike member.

For a rotary-style latch, such as the Model 62279 latch from Eberhard®, the latch member is also first manually positioned into engagement with the strike member. As with the over-center latch, the rotary latch also employs a single-action, straight-line force along the latch member's longitudinal axis by which to supply adequate tension against the strike. The rotary latch, however, is actuated by rotational input force that is converted into straight-line force by way of its internal components.

The cam-style draw latch, such as the Model R5 latch from Southco®, employs a dual-action force which eliminates manual positioning of a latch member against a strike member. A cam-style latch actuator receives rotational input force which first urges a latch member to radially engage an adjacent strike member. Once engaged, a final cam-driven straight-line force from the cam through the latch member and to the strike member supplies adequate tension to draw and secure the latch member to the strike.

Figure 10:
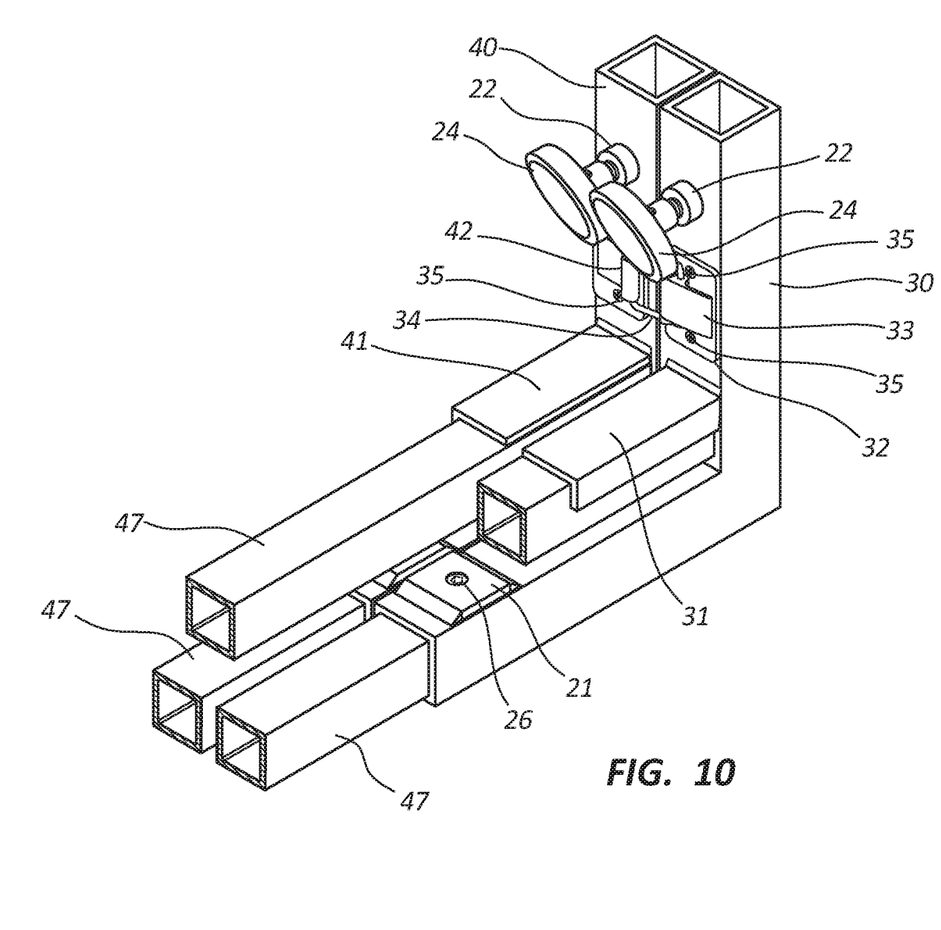

For the preferred embodiment, the latch assembly halves are mounted on the upper faces of the latch and strike retainers. The latch assembly halves may also be fastened to the inner surface of their respective corner's vertical leg in the specific area between the corner's retainer and its socket end. This specific location (FIG. 10) is the only other available latch mounting surface within the distal rectangular frame periphery of an alpha-oriented overhead frame.

Welding is mentioned throughout as a means of permanently joining various parts to construct a single component. Alternate means of consolidating components; including 3-D printing, injection molding, and CNC machining; may also be used. Non-metallic materials, such as carbon fiber, may also be used throughout. Additionally, each corner may also be formed from one piece of tubing by bending the tubing at 90°.

For the present invention, the corners and sides are described as being constructed of square tube. These may be constructed of another profile or cross section, such as pipe or triangular tubing.

I claim:

1. Corner structures for overhead frames, said corner structures comprising a first corner of said corner structures being designated as a latch corner and a second corner of said corner structures being designated as a strike corner, each of said corner structures comprising a length of tubular material formed into a right angle, said right angle when in an alpha orientation comprising a vertical leg and a horizontal leg, said vertical leg having multiple surfaces including an inner surface, said horizontal leg having multiple surfaces including an upper surface, the ends of said tubular material forming sockets oriented at 90 degrees to one another, each of said sockets capable of receiving a side of an overhead frame, said corner structures further comprising secondary component fasteners affixed to said corner structures, said secondary component fasteners comprising a latch retainer, a strike retainer, and a latch assembly, (a) said latch retainer comprising a first section of flat, rigid material having an upper face and a lower face, said latch retainer having a predetermined length and a width substantially equal to or less than the outside diameter of said horizontal leg of said latch corner, said latch retainer affixed to said inner surface of said vertical leg in an orientation that is parallel to said horizontal leg of said latch corner, said lower face of said latch retainer facing toward said upper surface of said horizontal leg and at such a distance away from said upper surface that a swing side may be placed between said lower face of said latch retainer and said upper surface of said horizontal leg, (b) said strike retainer comprising a second section of flat, rigid material having an upper face and a lower face, said strike retainer having a predetermined length and a width substantially equal to or less than the outside diameter of said horizontal leg of said strike corner, said strike retainer affixed to said inner surface of said vertical leg in an orientation that is parallel to said horizontal leg of said strike corner, said lower face of said strike retainer facing toward said upper surface of said horizontal leg and at such a distance away from said upper surface that a swing side may be placed between said lower face of said strike retainer and said upper surface of said horizontal leg, (c) said latch assembly comprising a latch body half and a strike member half, said strike member half capable of receiving and mating with said latch body half, (1) said latch body half fastened to said latch corner at a predetermined latch body location within an area defined as the distal rectangular periphery of overhead frame components in an alpha orientation, said latch body half comprising a latch actuator movably affixed to said latch body half, and a latch member movably affixed to said latch actuator, said latch actuator providing a means for transferring an input force to said latch member so that said latch member is capable of engaging with said strike member half, (2) said strike member half fastened to said strike corner at a predetermined strike member location within said area defined as the distal rectangular periphery of overhead frame components in an alpha orientation so that said latch member is capable of engaging said strike member half when said latch corner and said strike corner are together positioned in said alpha orientation, the engagement between said latch member and said strike member half thereby rigidly joining said latch corner to said strike corner, whereby obstructions to said alpha orientation of said overhead frame components are precluded; said alpha orientation is maintained; protrusions extending beyond said distal rectangular periphery of an alpha-oriented frame are eliminated; the width of alpha-oriented components is reduced; and whereby said overhead frames disassembled into a prime configuration are capable of being rigidly bundled into said alpha orientation without a time-consuming and wasteful use of temporary materials.

2. The corner structures of claim 1 each further including a vertical appendage of predetermined size, said vertical appendage comprising an inner vertical surface and an outer vertical surface, said vertical appendage being affixed to the lower faces of said latch retainer and said strike retainer at each of the retainers' vertical edges which are nearest the outer periphery of said corner structures when said corner structures are in said alpha orientation, whereby said swing side may be laterally as well as vertically restrained in said alpha orientation for applications in which a manufacturer has eliminated gussets.

3. The corner structures of claim 1 wherein said latch actuator comprises an over-center style latch actuator.

4. The corner structures of claim 1 wherein said latch actuator comprises a rotary-style latch actuator.

5. The corner structures of claim 1 wherein said latch actuator comprises a cam-style latch actuator.

6. The corner structures of claim 1 wherein said predetermined latch body location is on said upper face of said latch retainer.

7. The corner structures of claim 1 wherein said predetermined latch body location is on said inner surface of said vertical leg of said latch corner between said latch retainer and the socket end of said vertical leg of said latch corner.

8. The corner structures of claim 1 wherein said predetermined strike member location is on said upper face of said strike retainer.

9. The corner structures of claim 1 wherein said predetermined strike member location is on said inner surface of said vertical leg of said strike corner between said strike retainer and the socket end of said vertical leg of said strike corner.

\* \* \* \* \*